UNITED STATES PATENT OFFICE 2,145,595

ORGANIC MERCURY COMPOUNDS AND A METHOD OF MAKING THE SAME

Karl Görnitz, Teltow, and Willy Harnack and Otto Wurm, Berlin-Friedrichshagen, Germany, assignors to Schering-Kahlbaum A. G., Berlin, Germany, a corporation of Germany No Drawing. Application September 25, 1935, Serial No. 42,028. In Germany September 28, 1934

7 Claims. (Cl. 167—38)

This invention relates to organic mercury compounds, and more particularly to compounds that are very effective seed disinfectants, and a method of making the same.

It is known that many of the monomercurized organic compounds can be used as seed disinfectants in order to protect the grain against diseases caused by fungi. In contrast hereto dimercurized organic compounds in general are not suitable for this purpose. Thus, for instance, the dimercurized phenols, dimercuri benzene, the product obtained from dipentene and mercuric acetate, containing two mercury atoms, and others are ineffective, while the corresponding monomercurized compounds are useful disinfectants.

Hence, it was surprising that, as has been found, dimercuri carbides of the structural formula

represent very effective and excellent seed disinfectants. In the above given formula R may be a hydrocarbon radical, such as alkyl, aryl, aralkyl, or an alicyclic group. These hydrocarbon radicals may also be substituted, for instance, by OH-groups and the like. Especially suitable are compounds of the above given formula wherein R corresponds to the

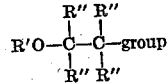

In this group R″ indicates either hydrogen or the same or different hydrocarbon radicals which may be arranged in such a manner that they form a nucleus, and which may also be substituted, while R′ may be hydrogen or a hydrocarbon radical, such as alkyl, aryl, aralkyl, or an alicyclic group, said hydrocarbon radicals being substituted or non-substituted.

These carbide compounds are, surprising to say, very stable towards water, a property that could not at all be expected; for, many metal carbides, such as calcium carbide and the like, are decomposed immediately on coming in contact with water. The water resistance of the new compounds is of such a degree that, for instance, bis-phenyl mercuri carbide or bis-methoxy ethyl mercuri carbide do not show any indication of decomposition even when kept for several days immersed in water.

The new products do not attack metallic iron and do not cause irritations of the skin as this is frequently the case with many other organic mercury compounds.

They are produced in a very simple manner by reacting with acetylene solutions of mercury compounds of the general formula R—Hg—X, R corresponding to the above given definition while X is any group capable of forming salts or complex salts with mercury, such as the acetic, lactic, oxalic, sulfuric, hydrochloric, thiocyanic acid radicals and the like. Thereby the new compounds precipitate, for instance, when working in alcoholic solutions, and can be isolated very readily.

The following examples serve to illustrate the method of producing these new compounds, without, however, limiting the invention to them:

Example 1

Bisisopropylmercuricarbide is formed by introducing acetylene into an alkaline solution of isopropylmercurichloride, the reaction product containing 78.2% mercury. It is ground with sufficient talc so that the mercury content is 2%.

Example 2

Bismethoxyethylmercuricarbide is formed by introducing acetylene into an alkaline alcoholic solution of methoxyethylmercurichloride, and the water-insoluble precipitate is isolated. The product is diluted with a suitable diluent in finely divided state to provide a seed disinfectant.

Example 3

Bisethoxyethylmercuricarbide is obtained in a manner similar to Example 2 from acetylene and ethoxyethylmercurichloride to provide a dry seed disinfectant.

Example 4

Bisphenylmercuricarbide is formed by introducing acetylene into an alkaline solution of phenylmercuriacetate, the reaction product being water-insoluble and stable at room temperatures. It is isolated and ground with sufficient talc to give a composition having a 3% mercury content.

In the same simple manner there may be produced the corresponding bis-butyl, -isoamyl, -cyclohexyl, -tolyl, -xylyl, -benzyl, -amino phenyl, -nitro phenyl, -ethanol, -propanol, -methoxy ethyl, ethoxy ethyl, -ethoxy propyl, -phenoxy ethyl, -benzyloxy ethyl, and the like mercuri acetylides.

Very effective seed disinfectant compositions may be prepared by mixing said new mercury acetylides with a suitable diluent, such as finely divided clay, chalk, talcum, kaolin, kieselguhr, silicagel, and the like. Thereto may be added other fungicides, stimulating agents, compounds capable of increasing their adhesiveness, agents to prevent dusting, and the like.

Of course, one may prepare such compositions by a one-step process in the course of the manufacturing process of said new compounds. For this purpose the reaction between the organic mercury salt compound and acetylene is carried out in the presence of the diluent and/or the other ingredients of the composition.

The following table serves to illustrate the invention without, however, limiting the same to them. It gives a summary of the effectiveness of some of the compounds claimed, in comparison with known mercury seed disinfectants. The products were used in a concentration of 1.5 parts of the seed disinfectant to 1000 parts of the seed to be treated. The figures indicate the number of seeds which were infected by Fusarium; thereby for each experiment 100 grains were used.

| Treated with a composition containing | Badly infected | Considerably infected | Total |
|---|---|---|---|
| | | | Percent |
| Untreated | 32 | 28 | 60 |
| Bis-isopropyl mercuri carbide 2.0% Hg-content | 3 | 11 | 14 |
| Bis-methoxy ethyl mercuri carbide 1.5% Hg-content | 0 | 7 | 7 |
| Bis-methoxy ethyl mercuri carbide 3.0% Hg-content | 1 | 8 | 9 |
| Bis-ethoxy ethyl mercuri carbide 1.5% Hg-content | 0 | 6 | 6 |
| Bis-phenyl mercuri carbide 2.0% Hg-content | 2 | 12 | 14 |

*Comparison with known mercury compounds*

| | | | |
|---|---|---|---|
| Trichloro ethene mercuri acetate 3% Hg-content | 3 | 16 | 19 |
| Ethanol mercuri chloride 6% Hg-content | 5 | 14 | 19 |
| Terpinolen mercuri acetate, 2% Hg-content | 12 | 31 | 43 |
| Cumarin mercuri chloride 2.5% Hg-content | 4 | 22 | 26 |
| Acetoxy cyclohexyl mercuri chloride 3% Hg-content | 6 | 18 | 24 |
| Standard seed disinfectant as available on the market 2% Hg-content | 2 | 25 | 27 |

Thus, it follows that the new seed disinfectants described and claimed herein are far superior to the known mercury seed disinfectants.

The compounds described and claimed herein are not only suitable and effective seed disinfectants, but may be used also for conservation and other disinfecting purposes, as, for instance, for impregnating wood, preserving glue and the like.

Of course, many changes and variations in conditions employed on producing the new mercury acetylides as well as the seed disinfectant compositions, may be made by those skilled in the art in accordance with the principles set forth herein and in the claims annexed hereto.

What we claim, is:

1. A seed disinfectant composition, comprising an organic mercury compound of the structural formula

wherein R is taken from the group consisting of hydrocarbon and alkoxy hydrocarbon radicals.

2. A seed disinfectant composition, comprising a bis-alkoxy alkyl mercuri carbide of the structural formula

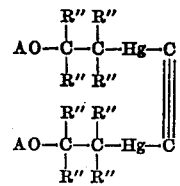

wherein A is an alkyl radical and R'' is a radical taken from the group consisting of hydrogen and alkyl radicals.

3. A method of producing a seed disinfectant composition, comprising causing contact between acetylene and an organic mercury salt compound of the structural formula R—Hg—X wherein R is an alkoxy hydrocarbon radical and X a group which is capable of forming salts or complex salts with mercury to cause a reaction to take place therebetween.

4. A method of producing a seed disinfectant composition, comprising causing contact between an organic mercury salt compound of the type R—Hg—X, wherein X is a group which is capable of forming salts or complex salts with mercury and acetylene in the presence of the other ingredients of said composition.

5. A seed disinfectant composition according to claim 1, containing about 1.5–3.0% of said organic mercury compound in conjunction with a solid diluent.

6. A seed disinfectant composition, comprising an organic mercury compound of the structural formula

wherein R is a radical corresponding to the group

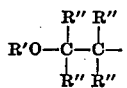

wherein R' and R'' are radicals taken from the group consisting of hydrogen and hydrocarbon radicals.

7. A seed disinfectant composition, comprising an organic mercury compound of the structural formula

wherein R is a radical corresponding to the group

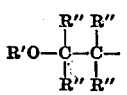

wherein R' and R'' are radicals taken from the group consisting of hydrogen and hydrocarbon radicals, the carbon atoms of adjacent R'' groups constituting a carbon ring with the —C—C— group.

KARL GÖRNITZ.
OTTO WURM.
WILLY HARNACK.